(12) United States Patent
Scheffel et al.

(10) Patent No.: US 8,292,773 B2
(45) Date of Patent: Oct. 23, 2012

(54) POWERTRAIN FOR A MOTOR VEHICLE

(75) Inventors: Torsten Scheffel, Ingolstadt (DE);
Christian Meixner, Ingolstadt (DE);
Johann Märkl, Ingolstadt (DE)

(73) Assignee: Audi, AG, Ingolstadt (DE)

( * ) Notice: Subject to any disclaimer, the term of this patent is extended or adjusted under 35 U.S.C. 154(b) by 0 days.

(21) Appl. No.: 13/249,393

(22) Filed: Sep. 30, 2011

(65) Prior Publication Data

US 2012/0142478 A1 Jun. 7, 2012

Related U.S. Application Data

(62) Division of application No. 12/167,144, filed on Jul. 2, 2008, now Pat. No. 8,070,639.

(30) Foreign Application Priority Data

Jul. 4, 2007 (DE) .................. 10 2007 031 011

(51) Int. Cl.
*F16H 37/02* (2006.01)

(52) U.S. Cl. ..................................... 475/210

(58) Field of Classification Search ............ 475/198, 475/201, 210
See application file for complete search history.

(56) References Cited

U.S. PATENT DOCUMENTS

| 4,410,071 | A | * | 10/1983 | Osterman | 477/4 |
| 4,548,100 | A | * | 10/1985 | Hohn | 475/200 |
| 4,562,897 | A | * | 1/1986 | Renneker | 180/233 |
| 6,342,024 | B1 | * | 1/2002 | Walter et al. | 475/210 |
| 6,997,831 | B2 | * | 2/2006 | Kanda et al. | 474/8 |
| 2004/0014547 | A1 | * | 1/2004 | Habuchi et al. | 475/210 |

FOREIGN PATENT DOCUMENTS

| DE | 10212790 A1 | 11/2003 |
| DE | 10238664 A1 | 4/2004 |

* cited by examiner

*Primary Examiner* — Justin Holmes
(74) *Attorney, Agent, or Firm* — Novak Druce + Quigg LLP

(57) ABSTRACT

A power train for a vehicle comprising an engine with an output shaft; a transmission disposed on a centerline having a drive input disposed laterally on a first side of the centerline and a drive output disposed laterally on a second side of the centerline opposite of such first side; a first differential having an input shaft aligned with and connected to the drive output of the transmission, a first output shaft projecting through an opening in the transmission and a second output shaft; a first transversely disposed axle having a second differential; a second transversely disposed axle having a third differential; a first drive train interconnecting the engine output shaft and the transmission drive input; a second drive train interconnecting the first output shaft of the first differential and the second differential; and a third drive train interconnecting the second output shaft of the first differential and the third differential.

5 Claims, 5 Drawing Sheets

POWERTRAIN FOR A MOTOR VEHICLE

This application is a division of U.S. patent application Ser. No. 12/167,144 filed on Jul. 2, 2008, now U.S. Pat. No. 8,070,639 which claims priority from German Application No. 10 2007 031 011.2, filed Jul. 4, 2007. The entire disclosure of U.S. patent application Ser. No. 12/167,144 is hereby incorporated by reference.

Powertrain for a motor vehicle with a variator for continuous transmission of torque.

Powertrains such as these are used in automotive engineering when continuously variable transmission of torque is desired.

PRIOR ART

DE 10238664 A1 discloses a drive assembly with a starting element which is connected on the input side to the driven side of a vehicle, which forms a crankshaft axle and is connected on the output side to a speed changing gear. The output shaft of the speed changing gear is located on the same side as the input shaft and runs essentially parallel to it. By way of a subsequent gear stage a lateral offset is achieved so that the output shaft has a greater distance to the crankshaft axle than the input shaft. A front axle differential whose driven shaft runs between the engine and starting element is connected to the output shaft of the subsequent gear stage.

The disadvantage is that a gear for continuously variable transmission of torque in a variator design cannot be connected to this drive assembly, since, for design reasons, a very large amount of installation space is lost in this way. Furthermore, it is not possible to provide this drive assembly with a variator and at the same time to implement a center arrangement on the longitudinal axis of the vehicle, as a result of which the leg room in the passenger compartment is greatly restricted. Another disadvantage is that no means are included which allow the rpm on the input shaft of the speed change gear to be changed such that it can be operated as efficiently and carefully as possible.

DE 10212790 A1 shows a speed change gear with an engine on whose driven side, which forms a crankshaft axle, two starting elements are connected. The first starting element establishes a connection to a constant transmission ratio stage which contains two transmission ratios. The second starting element establishes a connection to a third starting element by way of a shaft which runs in a hollow shaft. The third starting element is connected on the output side to a preliminary gear stage whose output shaft has a lateral offset. The output shaft of the preliminary gear stage leads to an input-side disk set of the variator. An output-side disk set of the variator is connected to an optional clutch. On the output shaft of the clutch there are three gears, two of them being the initially described gears of the constant transmission ratio stage. The third gear is connected to the third starting element and is used to reverse the direction of driving. A front axle differential whose driven shafts run between the engine and the first starting element is connected to the output shaft of the gear which is the last one viewed from the clutch.

The disadvantage is that the variator for reasons of design has a lateral offset which leads to the illustrated speed change gear not being able to be placed in the middle on the longitudinal axis of the vehicle, as a result of which the leg room in the passenger compartment is greatly limited. Furthermore, this arrangement leads to a large amount of installation space being required. Another disadvantage is that it is not possible to adapt the rpm which has been changed on the input side by the preliminary gear stage of the variator on the output shaft of the variator again such that the potential of the variator can be fully used, with simultaneous gentle operation.

OBJECT

The object of this invention is therefore to make available a powertrain which with a variator ensures continuously variable transmission of torque and takes up little installation space in doing so, and implements simple rpm matching to vehicles with different engines and weight.

This object is achieved by the features of claim 1.

A powertrain for a motor vehicle which has an engine with a driven shaft which has a crankshaft axle which is located longitudinally to the direction of travel and which is connected to a starting unit, a preliminary gear stage with an input shaft and an output shaft, the input shaft of the preliminary gear stage being connected to the starting unit and the output shaft of the preliminary gear stage having a lateral offset to the crankshaft axle, a variator which is preferably made as a disk variator with two adjustable disk sets for the continuous transmission of torque and for which the input-side disk set is connected to the output shaft of the preliminary gear stage, while the output-side disk set is located laterally offset, a subsequent gear stage which has an input shaft and an output shaft and which is located on the same side of the variator as the preliminary gear stage, the input shaft of the subsequent gear stage being connected to the output-side disk set of the variator, and a first differential with a lateral driven shaft which is located transversely to the direction of travel and between the engine and the starting unit, and forms a first drive axle, the first differential being connected to the output shaft of the subsequent gear stage.

By the preliminary gear stage being located on the input side on the variator, the rpm dictated by the internal combustion engine as well as the torque can be adapted such that on the variator on the input side there are an rpm and a torque which are especially advantageous for the variator. Because there is a subsequent gear stage on the output side on the variator, the rpm prevailing on the output side on the variator as well as the torque can be adapted such that it is especially advantageous for the bevel wheel gear on the first differential. Thus it is possible to adapt the powertrain by variation of the preliminary and/or subsequent gear stages to different vehicles and/or internal combustion engines. By combining the preliminary gear stage, subsequent gear stage and the first differential, the variator can be optimally positioned in the region of the longitudinal axis of the vehicle and/or the transverse axis of the vehicle, at the same time the lateral offset for the first differential which is located laterally next to the engine being accomplished. The first differential which is located compactly on the engine allows especially efficient use of the existing installation space and the driven shafts are located especially close to the engine; this benefits drivability of the vehicle. Furthermore, by using a preliminary gear stage and a subsequent gear stage which are both located on the same side of the variator, in the region of the vehicle tunnel a compact powertrain which is located in the middle to the longitudinal axis of the vehicle is made available. This powertrain arrangement is widened by the lateral first differential only in the engine compartment, but not in the powertrain tunnel, so that installation space is optimally used for the passenger compartment and also for the arrangement of other assemblies. The combination of the preliminary gear stage, variator, subsequent gear stage and first differential laterally next to the engine so that the lateral driven shaft can be located between the engine and the starting unit makes it possible to make available a continuously variable powertrain which has a variator and which is compact in the region of the tunnel and can be located in the middle relative to the longitudinal axis of the vehicle, and which in the longitudinal extension of the motor vehicle is very short because the first differential can be located with its lateral driven shaft next to the engine.

In another embodiment, there is a torsional vibration damper, in particular a dual-mass flywheel, between the engine and the starting unit.

In another version, on the first differential there is a bevel wheel gear consisting of a ring gear and a pinion wheel, the pinion wheel being connected to the output shaft of the subsequent gear gear. By varying the dimensions of the pinion wheel and/or ring gear, additional possibilities arise for matching the rpm and/or the torque to the engine and/or vehicle.

In another version, parallel to the first drive axle, there is a second drive axle.

In another version, in particular for all-wheel drive vehicles, the output shaft of the output-side disk set has a shaft extension in the direction of the second drive axle.

In another version, in particular for all-wheel drive vehicles, there is a gear stage with an input shaft and an output shaft between the output-side disk set and the second drive axle, the input shaft of the gear stage being formed by the shaft extension and the output shaft of the gear stage being located laterally offset thereto. In this way the output shaft of the gear stage can be routed in the longitudinal direction in the middle on the vehicle to the second drive axle.

In another version, in particular for all-wheel drive vehicles, between the output-side disk set and second drive axle there is a clutch. Thereby it is possible to variably transmit the torque flow to the second drive axle or to connect or disconnect it.

In another version, in particular for all-wheel drive vehicles, the output-side disk set is provided with a passage and on it there is a longitudinal differential which is connected to the shaft extension.

In another version, in particular for all-wheel drive vehicles, there is a second differential with lateral driven shafts on the second drive axle.

In another version, the starting unit is made such that one section forms a forward clutch which is actuated when driving forward, and another section forms a reverse clutch which is actuated when driving in reverse.

In another version there is a planet wheel set between the starting unit and the preliminary gear stage.

In another version, when driving forward the torque runs from the driven shaft of the engine via the forward clutch and the planet wheel set to the preliminary gear stage.

In another version, when driving in reverse the torque runs from the driven shaft of the engine via the planet wheel set to the preliminary gear stage.

In another version, the output shaft of the subsequent gear stage has a greater lateral offset to the crankshaft axle than the input shaft of the subsequent gear stage. In conjunction with the lateral offset of the preliminary gear stage this allows an especially space-saving execution. In this way the variator with its fixed dimensions, by matching of the preliminary and/or subsequent gear stage, can be placed in the transverse direction such that the existing installation space is used as efficiently as possible.

In another version, the subsequent gear stage in the longitudinal direction is located nearer the first drive axle than the preliminary gear stage. In this way the preliminary and the subsequent gear stage can be installed especially close to one another so that the existing installation space is used as efficiently as possible.

In another version, the axes of rotation of the disk sets of the variator lie at different heights over the roadway, preferably the axis of rotation of the input-side disk set is higher than the axis of rotation of the output-side disk set of the variator. In this way, it is possible to place the variator such that the existing installation space is used as efficiently as possible.

EMBODIMENT

Other details, features and advantages of the invention will become apparent from the following description of one preferred embodiment with reference to the drawings.

Figure 1:
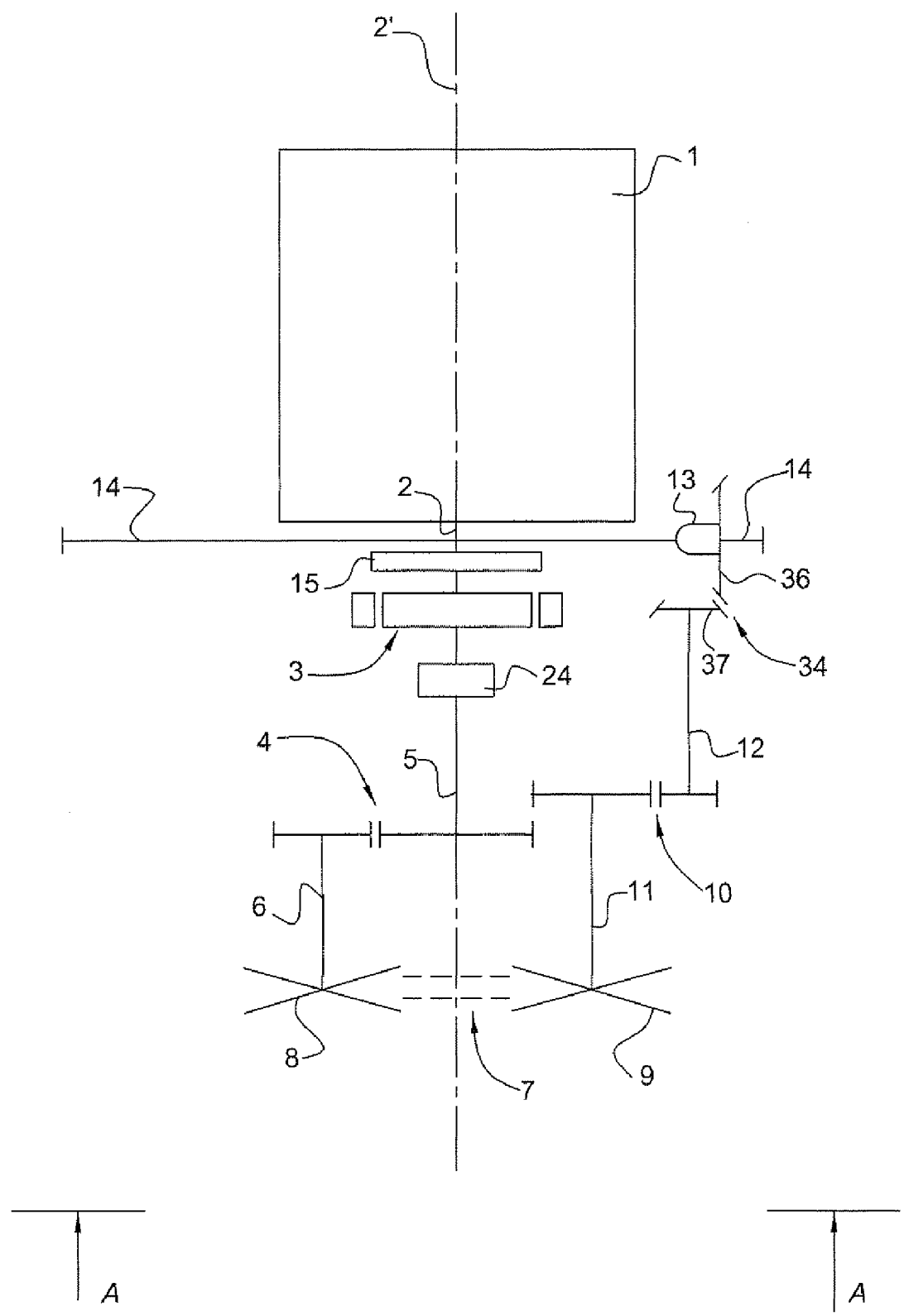
FIG. 1 shows a schematic top view of the powertrain according to the invention for a motor vehicle.

As shown in FIG. 1, a powertrain for a motor vehicle has an engine 1 with a crankshaft as the driven shaft 2 which forms a crankshaft axle 2', and a dual-mass flywheel 15 located on it as a torsional vibration damper, and a multi-disk wet clutch 3 as the starting unit with a planet wheel set 24 located on it. It is connected to a preliminary gear stage 4 with an input shaft 5 and an output shaft 6. The output shaft 6 of the preliminary gear stage 4 is connected to the input-side disk set 8 of the variator 7. The output-side disk set 9 of the variator 7 is arranged laterally offset to the crankshaft axle 2'. The output shaft 6 of the preliminary gear stage 4 and the output-side disk set 9 of the variator 7 here are located on opposite sides of the crankshaft axle 2'. The output-side disk set 9 of the variator 7 is connected to the input shaft 11 of the subsequent gear stage 10, the longitudinal direction of the vehicle lies on the same side of the variator 7 as the output shaft 6 of the preliminary gear stage 4. The output shaft 12 of the subsequent gear stage 10 is arranged such that the preliminary gear stage 4 and the subsequent gear stage 10 each have a lateral offset in a different transverse direction of the vehicle, in particular pointing away from the crankshaft axle 2'. On the output shaft 12 of the subsequent gear stage 10 there is a first differential 13 arranged such that one of the lateral driven shafts 14 which form a first drive axle 14, crosses the driven shaft 2 between the engine 1 and the torsional vibration damper 15. On the first differential 13 there is a bevel wheel gear 34 which is formed by a ring gear 36 which is connected to the first differential 13, and a pinion wheel 37 which is connected to the output shaft 12 of the subsequent gear stage 10 and which drives the ring gear 36. The ring gear 36 is located on the side of the first differential 13 which is farthest away from the crankshaft axle 2', as a result of which the desired direction of rotation of the lateral driven shafts 14 is obtained. The first differential 13 is then compactly located laterally on the engine 1.

Figure 2:
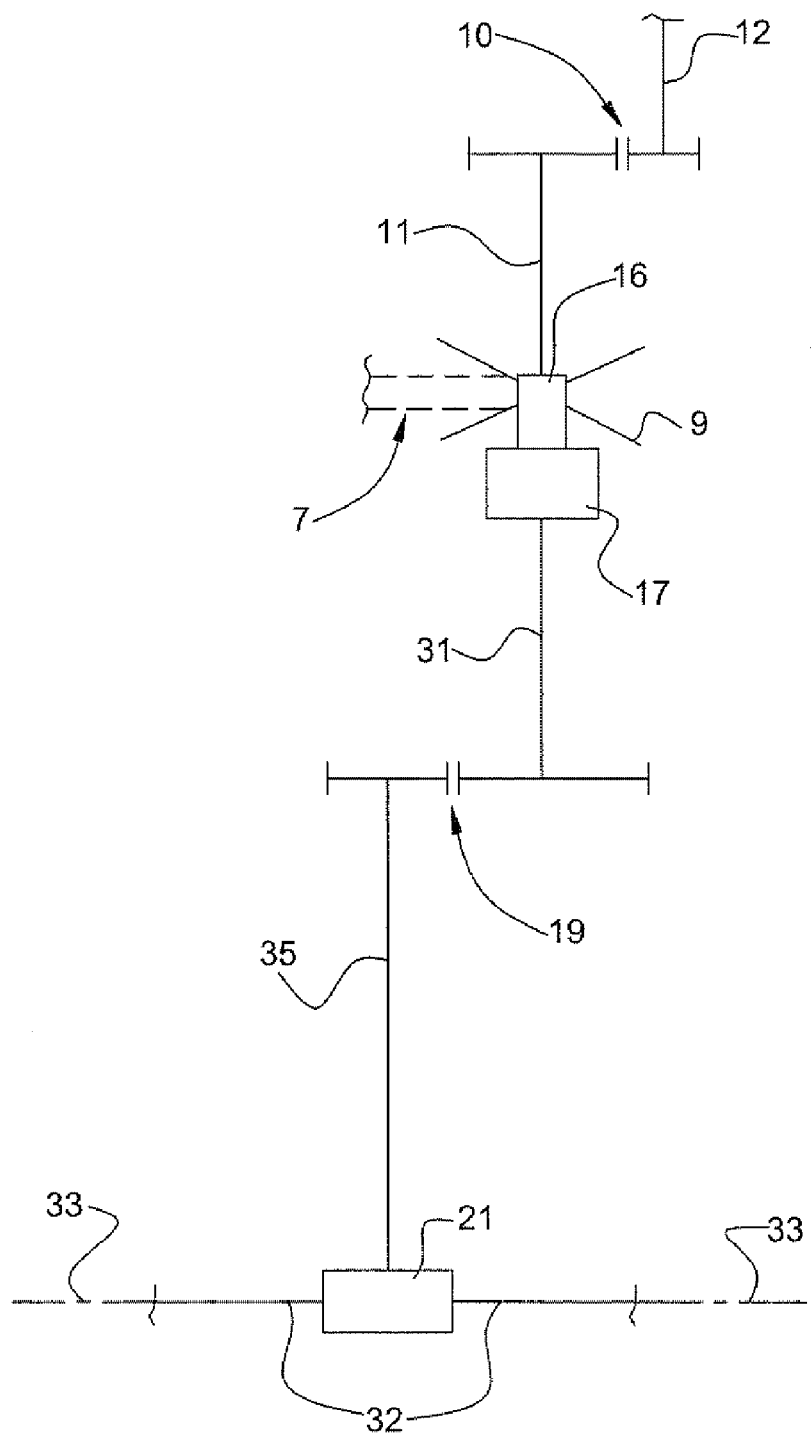
FIG. 2 shows a schematic top view of the output-side disk set for driving two axles using a longitudinal differential and optional gear stage.

As shown in FIG. 2, the powertrain for a motor vehicle, in addition to the features already shown in FIG. 1, has an output-side disk set 9 of the variator 7 which is provided with a through opening 16 and on which there is a longitudinal differential 17. The longitudinal differential is preferably of the Torsen design and has one opening each per side in the longitudinal direction. The input shaft 11 of the subsequent gear stage 10 leads out of the opening which is facing toward the engine. From the opening opposite the engine a shaft extension 31 leads in the direction of a second drive axle 33. A second differential 21 is connected to the shaft extension 31, which is located on the second drive axle 33, and from it two lateral driven shafts 32 extend to the wheels of the motor vehicle. On the shaft extension 31 there can optionally also be a gear stage 19 whose input shaft 31 is formed by the shaft extension 31 and whose output shaft 35 is located laterally offset to the input shaft 31 and leads to the second differential 21. In this way it is possible to route the powertrain in the longitudinal direction of the vehicle in the middle to the second drive axle 33.

Figure 3:
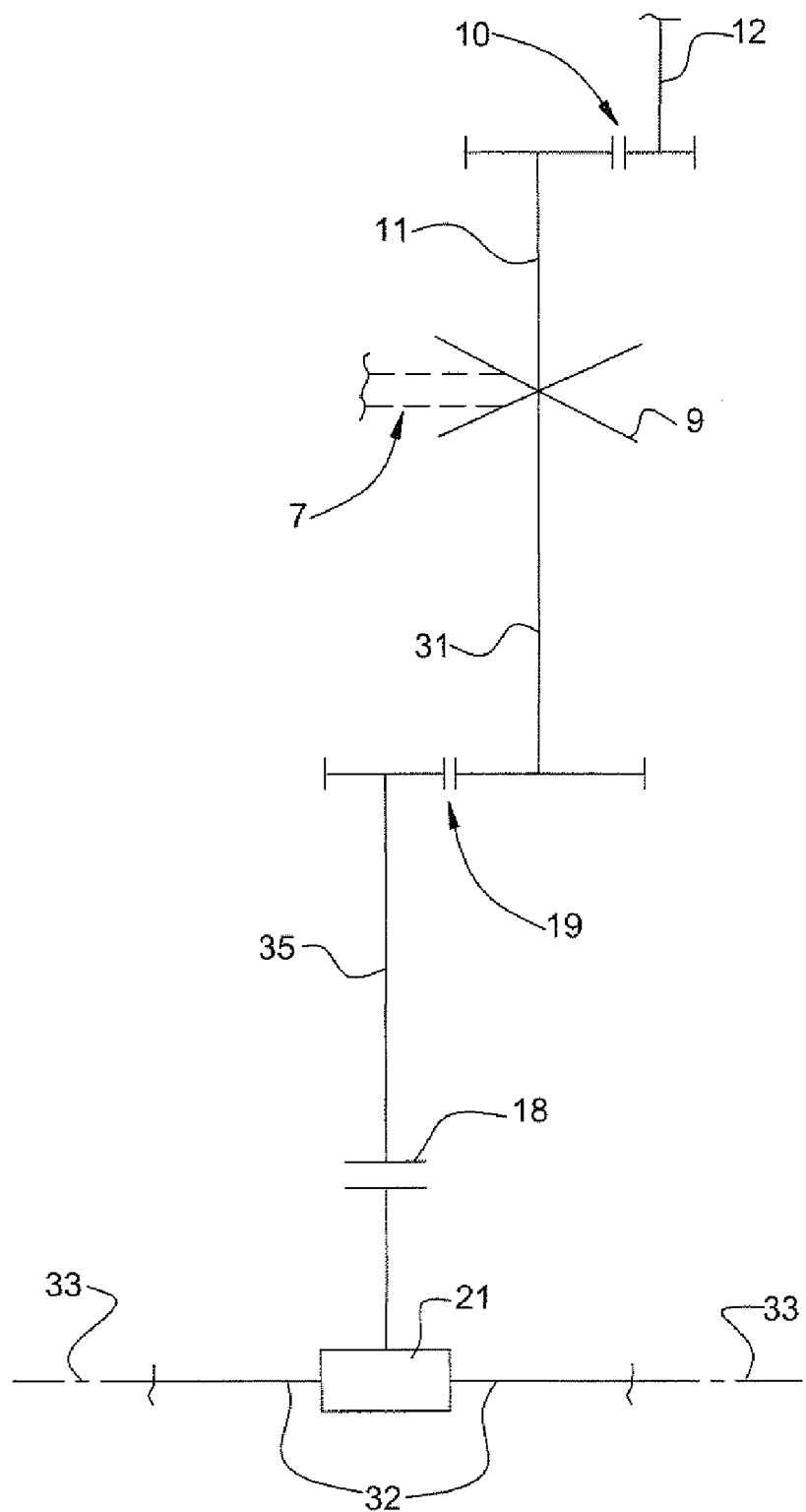
FIG. 3 shows a schematic top view of the output-side disk set for driving two axles using a clutch and optional gear stage.

As shown in FIG. 3, the powertrain for a motor vehicle, in addition to the features already shown in FIG. 1, has an output-side disk set 9 of the variator 7 which has a shaft extension 31 in the direction of the second drive axle 33. Optionally, on the shaft extension 31 there is a gear stage 19 whose input shaft 31 is formed by the shaft extension 31 and whose output shaft 35 is located laterally offset to the input shaft 31. On one of the shafts (31, 35), between the output-side disk set 9 and the second drive axle 33, there is a clutch 18 which is made preferably as a slip-controlled clutch in a Haldex design. On the second drive axle 33 in the transverse direction of the vehicle there is a second differential 21 with lateral driven shafts 32 which, depending on the presence of the gear stage 19, is driven either by the shaft extension 31 or the output shaft 35 of the gear stage 19.

Figure 4:
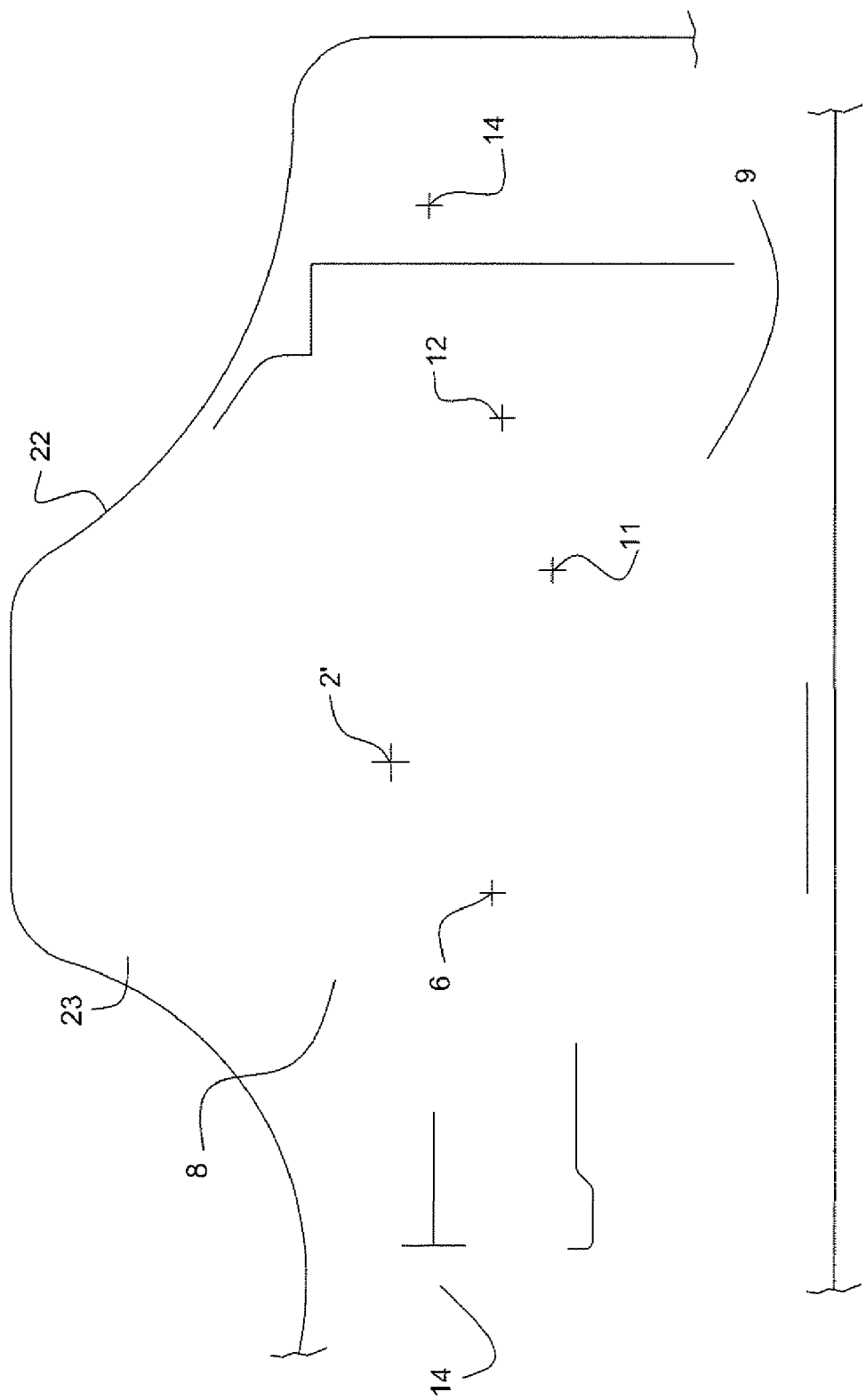
FIG. 4 shows a front view of the powertrain along line A-A as shown in FIG.

As shown in FIG. 4, the powertrain is dimensioned for a motor vehicle with a housing 23 such that it can be fitted into the transmission tunnel 22 of a motor vehicle with as little consumption of installation space as possible. This is done by varying the vertical position over the roadway, both of the input-side 8 and also the output-side disk set 9 of the variator and additionally matching the dimensions and positions both of the preliminary gear stage 4, the subsequent gear stage 10 and also the bevel wheel gear 34. In this way it is possible to align the variator 7 as much as possible in the middle to the crankshaft axle 2'.

Figure 5:
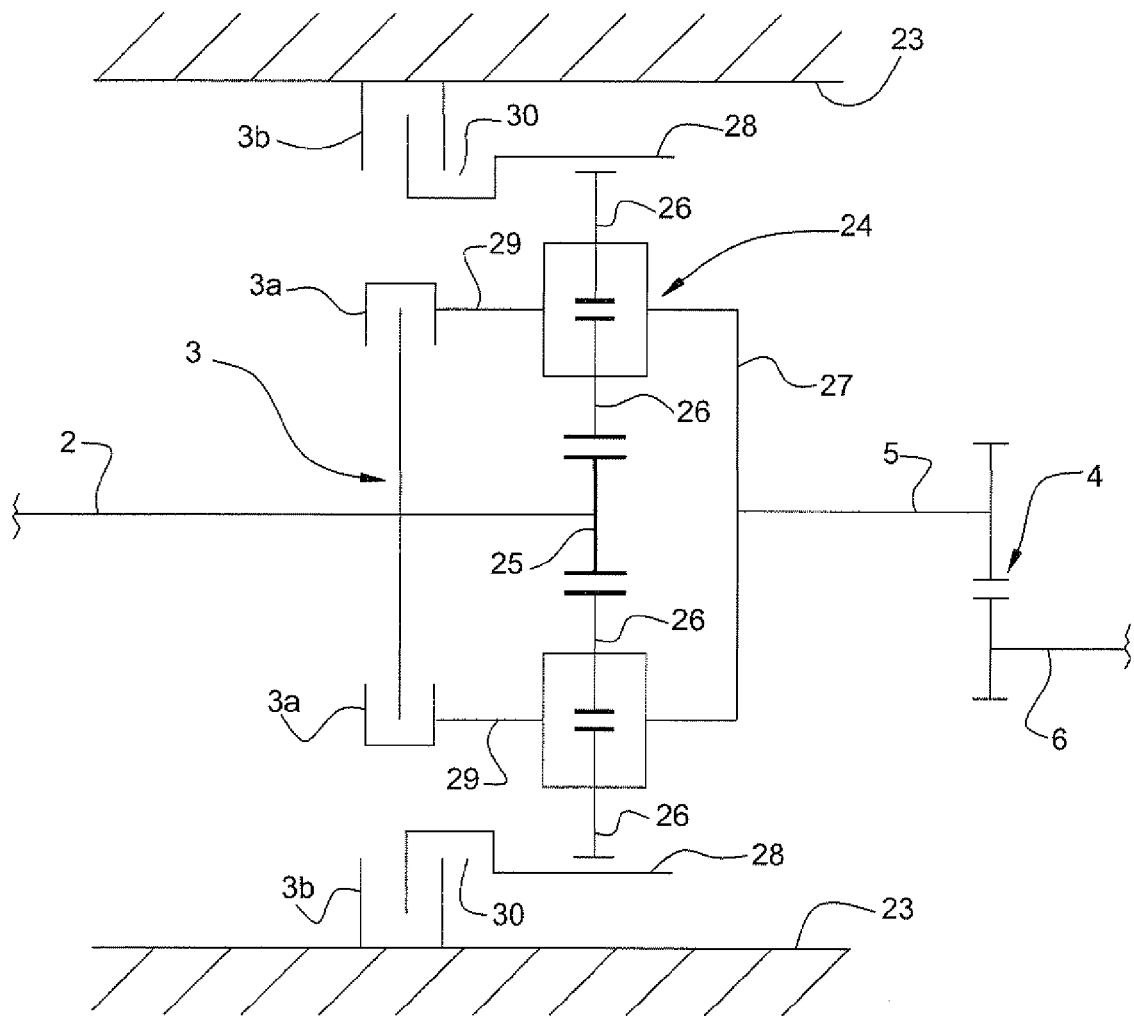
FIG. 5 shows a detailed top view of the starting unit and of the planet wheel set.

As shown in FIG. 5, the powertrain for a motor vehicle, in addition to the features already shown in FIG. 1, has a starting unit 3 which has a section as a forward clutch 3 for driving forward and a section as a reverse clutch 3b for driving in reverse. But only one of the two sections can ever be engaged at a time. The starting unit 3 is made as a multi-disk wet clutch and is located on the driven shaft 2 which runs through it. Furthermore, there is a planet wheel set 24 which has a sun gear 25, several, preferably three, pairs of planet wheels 26, which are connected among one another with the planet carrier 27, and a ring gear 28. The driven shaft 2 is located on the sun gear 25.

When driving forward, the forward clutch 3a connects the sun gear 25 and the planet carrier 27. In this way, the torque of the engine can run via the driven shaft 2 to the planet carrier 27 which turns in the direction of engine rotation and relays the torque to the input shaft 5 of the preliminary gear stage 4.

When driving in reverse, the reverse clutch 3b connects the ring gear 28 to the transmission case 23. Thus, the ring gear 28 is held fast by its being supported against the transmission housing 23. In this way the torque of the engine flows via the driven shaft 2 to the planet carrier 27 which turns opposite the direction of engine rotation and relays the torque to the input shaft 5 of the preliminary gear stage 4.

The invention claimed is:

1. A power train for a motor vehicle, comprising:
an engine with an output shaft disposed along a longitudinal centerline of said vehicle;
a variable torque transmission disposed on said centerline having a drive input disposed laterally on a first side of said centerline and a drive output disposed laterally on a second side of said centerline opposite of said first side;
a first differential having an input shaft aligned with and connected to the drive output of said transmission, a first output shaft projecting through an opening in said transmission and a second output shaft;
a first transversely disposed axle having a second differential gear;
a second transversely disposed axle having a third differential gear;
a first drive train operatively interconnecting said engine output shaft and said transmission drive input;
a second drive train operatively interconnecting said first output shaft of said differential and said second differential; and
a third drive train operatively interconnecting said second output shaft of said first differential and said third differential.

2. A power train according to claim 1 wherein said first differential comprises a TORSEN differential.

3. A power train according to claim 1 wherein a portion of said first transversely disposed axle is disposed between said engine and said variable torque transmission.

4. A power train according to claim 1 including a clutch disposed in said first drive train.

5. A power train according to claim 1 including a clutch disposed in said third drive train.

* * * * *